T 857042

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1038

628,881
SPINNERET

Eldon Lawrence Fletcher, Kingston, Ontario, Canada, and Michael John Wolstencroft, Collins Bay, Ontario, Canada, assignors, by mesne assignments, to E. I. du Pont de Nemours and Company, Wilmington, Del., a corporation of Delaware

Filed Apr. 6, 1967. Published Dec. 24, 1968
Class 18—8
1 Sheet Drawing. 2 Pages Specification

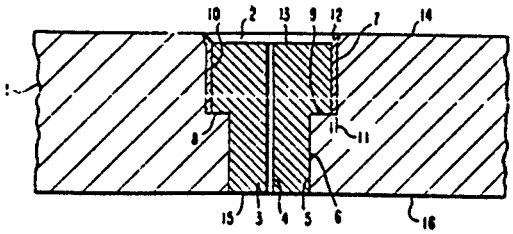

A spinneret for the production of melt spun filaments having an insert removably sealed in a through passage connecting the top and bottom surfaces of the spinneret plate.

United States Patent Office

PTO - BOYERS, PA Duty Station

MISSING PAGE TEMPORARY NOTICE

PATENT # T857042 FOR ISSUE DATE 12-24-1968 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheet 1

N/A at Boyers

6/1/94

Data Conversion Operation

Boyers, Pa